US010555844B2

(12) United States Patent
Kitchin et al.

(10) Patent No.: US 10,555,844 B2
(45) Date of Patent: *Feb. 11, 2020

(54) LIFT MECHANISM FOR WHEELCHAIRS IN VEHICLES

(71) Applicant: ALL-TERRAIN CONVERSIONS, LLC, Markle, IN (US)

(72) Inventors: Steven L. Kitchin, Fort Wayne, IN (US); Trent L. Bradburn, Muncie, IN (US); Kraig James Schlosser, Columbia City, IN (US)

(73) Assignee: All-Terrain Conversions, LLC, Markle, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,083

(22) Filed: Jun. 29, 2018

(65) Prior Publication Data
US 2019/0000699 A1 Jan. 3, 2019

Related U.S. Application Data

(63) Continuation of application No. 15/052,280, filed on Feb. 24, 2016, now Pat. No. 10,010,461.

(60) Provisional application No. 62/120,454, filed on Feb. 25, 2015.

(51) Int. Cl.
*A61G 3/06* (2006.01)
*B60P 1/43* (2006.01)

(52) U.S. Cl.
CPC ............. *A61G 3/061* (2013.01); *A61G 3/066* (2013.01); *B60P 1/433* (2013.01)

(58) Field of Classification Search
CPC .......... A61G 3/061; A61G 3/066; B60P 1/433
See application file for complete search history.

(56) References Cited

U.S. PATENT DOCUMENTS

| 4,909,700 | A  | 3/1990  | Fontecchio    |
| 5,370,493 | A  | 12/1994 | Oshima        |
| 6,071,064 | A  | 6/2000  | Hackett       |
| 6,190,112 | B1 | 2/2001  | Danilovic     |
| 6,264,416 | B1 | 7/2001  | Eaton, Jr.    |
| 6,343,908 | B1 | 2/2002  | Oudsten       |
| 6,390,537 | B1 | 5/2002  | DiGonis       |
| 7,001,132 | B2 | 2/2006  | Koretsky      |
| 7,641,209 | B2 | 1/2010  | Watters       |
| 7,802,801 | B2 | 9/2010  | Bartel        |
| 7,837,203 | B1 | 11/2010 | Schmidt       |
| 7,913,343 | B1 | 3/2011  | Cohn          |
| 8,079,798 | B2 | 12/2011 | Smith         |
| 8,371,589 | B2 | 2/2013  | Bartel        |
| 8,397,329 | B2 | 3/2013  | Just          |
| 8,505,141 | B1 | 8/2013  | Morris et al. |
| 8,534,979 | B2 | 9/2013  | Hansen        |
| 8,763,186 | B2 | 7/2014  | Mosey et al.  |

(Continued)

FOREIGN PATENT DOCUMENTS

WO  WO 2009140714  11/2009

*Primary Examiner* — Kaitlin S Joerger
(74) *Attorney, Agent, or Firm* — Barnes & Thornburg LLP

(57) ABSTRACT

This disclosure provides a system that combines together a wheelchair ramp and lift. The system starts inside the vehicle interior so that the ramp, when deployed, only protrudes several inches from the edge of the vehicle rather than several feet. This increases flexibility in the entry and egress of a wheelchair to and from a vehicle.

20 Claims, 6 Drawing Sheets

(56) References Cited

U.S. PATENT DOCUMENTS

| | | |
|---|---|---|
| 8,782,840 B2 | 7/2014 | Saucier |
| 8,807,619 B2 | 8/2014 | Miller |
| 8,926,254 B2 | 1/2015 | Pocobello |
| 8,967,669 B2 | 3/2015 | Kane |
| 8,998,558 B2 | 4/2015 | Kitchin et al. |
| 9,050,229 B1 | 6/2015 | Morris et al. |
| 9,101,519 B2 | 8/2015 | Smith |
| 9,126,522 B1 | 9/2015 | Perez |
| 9,271,883 B2 | 3/2016 | Johnson |
| 9,597,240 B2 | 3/2017 | Hermanson |
| 10,010,461 B2 * | 7/2018 | Kitchin .................. A61G 3/061 |
| 2001/0038787 A1 | 11/2001 | Beck |
| 2003/0044266 A1 | 3/2003 | Vandillen |
| 2009/0162175 A1 | 6/2009 | Pearson |
| 2014/0255138 A1 | 9/2014 | Bruns |
| 2014/0356116 A1 | 12/2014 | Hermanson |
| 2014/0369778 A1 | 12/2014 | Hermanson |
| 2015/0173984 A1 | 6/2015 | Kitchin et al. |
| 2016/0152170 A1 | 6/2016 | Kiyak |
| 2017/0216113 A1 | 8/2017 | Kiser |

* cited by examiner

LIFT MECHANISM FOR WHEELCHAIRS IN VEHICLES

RELATED APPLICATIONS

This application is a continuation of U.S. patent application Ser. No. 15/052,280, entitled, "Lift Mechanism for Wheelchairs in Vehicles," filed on Feb. 24, 2016 (now U.S. Pat. No. 10,010,461) which claimed priority to U.S. Provisional Patent Application No. 62/120,454, entitled, "Lift Mechanism for Wheelchairs in Vehicles" filed on Feb. 25, 2015. The subject matter disclosed in those applications are hereby expressly incorporated into the present application in their entireties.

TECHNICAL FIELD

This disclosure generally relates to wheelchair ramps and lifting apparatuses. In particular, this disclosure relates to a combined wheelchair ramp and lift, which protrudes out of a cabin opening. The user will roll onto the ramp and stay there while the lifting mechanism lifts the wheelchair and the ramp up into the vehicle.

BACKGROUND AND SUMMARY

There have been numerous vehicles modified over the years to allow wheelchair users the ability to enter or egress from them. Most common types will use a foldout ramp or a lifting apparatus to perform this task. Nearly all modified vehicles also need to have the floor lowered, or the ceiling raised, to allow adequate height for an individual in a wheelchair enough vertical room to maneuver inside the vehicle. One of the most common modified vehicles is a minivan.

One difficulty with existing ramp systems is that when the ramp deploys, it protrudes out from the door opening several feet from the vehicle, thereby requiring an exceptionally large parking area to be used. In many cases, the result is that a normal-sized parking space cannot be used and the wheelchair user must be picked up at a curb where there is sufficient space for the ramp to deploy. This reduces flexibility in the entry and egress of a wheelchair to and from a vehicle. Therefore, there is a need for a novel system that allows more flexible entry and egress of wheelchairs from vehicles.

According to one aspect, this disclosure provides a system that combines together a wheelchair ramp and lift. The system starts inside the vehicle interior so that the ramp, when deployed, only protrudes several inches from the edge of the vehicle rather than feet. This increases flexibility in the entry and egress of a wheelchair to and from a vehicle.

In one illustrative embodiment, this disclosure provides a vehicle having a wheelchair ramp and lift system. The vehicle includes a vehicle body including a vehicle floor and a vehicle cabin accessible by an opening. The ramp extension is movable between a stowed position in which the ramp extension is positioned within the vehicle cabin and an extended position in which the ramp extension extends out of the vehicle cabin through the opening. The vehicle also includes a ramp/lift assembly adjacent the opening in the vehicle cabin. The ramp/lift assembly includes a ramp surface movable between a ramped position in which the ramp surface defines an inclined plane between the vehicle floor and the ramp extension and a non-ramped position in which the ramp surface is substantially flush with the vehicle floor. A lift actuator is also provided that is configured to move the ramp/lift assembly between the ramped position and the non-ramped position. The lift actuator has a lifting capacity configured to move the ramp surface to the non-ramped position under a weight of a wheelchair and wheelchair user. For example, the lifting capacity of the lift actuator could be in excess of 750 pounds. In some embodiments, the ramp surface of the ramp/lift assembly is positioned entirely within the vehicle cabin between the ramped position and the non-ramped position. Embodiments are contemplated in which the ramp/lift assembly includes a top defined by the ramp surface and a bottom defining an underbody of the vehicle. In some cases, the ramped surface is dimensioned to support an entire wheelchair.

In some embodiments, the vehicle body includes a driver wall and a passenger wall and the vehicle floor has a width that extends between the driver wall and the passenger wall. The ramp surface could have a width that extends between the driver wall and the passenger wall more than approximately half the width of the vehicle floor. For example, the width of the ramp surface could be approximately 70% of the width of the vehicle floor.

Depending on the particular circumstances, the ramp extension could be sized to extend out of the vehicle cabin approximately one foot in the extended position. In some cases, the ramp extension extends approximately transversely with respect to the vehicle floor in the stowed position. For example, a linkage assembly could be provided that is configured to move the ramp extension between the stowed position and the extended position responsive to movement of the ramp/lift assembly between the ramped position and the non-ramped position. In some embodiments, the linkage assembly includes a linkage arm fixedly attached to the ramp extension. For example, the linkage assembly could include a ramp link with a first portion pivotally attached to the linkage arm and a second portion pivotally attached to the vehicle body. In some cases, the ramp/lift assembly is connected to the ramp extension with a hinge. For example, the ramp extension is configured to move between the extended position and stowed position by rotating about the hinge.

According to another aspect, this disclosure provides a vehicle having a wheelchair ramp and lift system. The vehicle includes a vehicle body having a vehicle floor and a vehicle cabin accessible by an opening. A ramp extension is provided that is movable between a stowed position in which the ramp extension is positioned within the vehicle cabin and an extended position in which the ramp extension extends out of the vehicle cabin through the opening. The ramp extension extends out of the vehicle cabin approximately one foot in the extended position. The vehicle includes a ramp/lift assembly adjacent the opening in the vehicle cabin. The ramp/lift assembly includes a ramp surface movable between a ramped position in which the ramp surface defines an inclined plane between the vehicle floor and the ramp extension and a non-ramped position in which the ramp surface is substantially flush with the vehicle floor. The ramp surface of the ramp/lift assembly is positioned entirely within the vehicle cabin between the ramped position and the non-ramped position. A lift actuator is configured to move the ramp/lift assembly between the ramped position and the non-ramped position. In some embodiments, the lift actuator has a lifting capacity in excess of 750 pounds.

According to a yet another aspect, this disclosure provides a method of deploying a ramp/lift assembly to provide a transition surface between a vehicle floor in a cabin of a vehicle and an alighting surface. The method includes the step of rotating a ramp extension with respect to the vehicle floor to an extended position in which the ramp extension extends out of the cabin of the vehicle. At least a portion of a ramp/lift assembly is lowered from a non-ramped position flush with the vehicle floor to a ramped position in which at least a portion of the ramp/lift assembly defines an inclined plane between the vehicle floor and the ramp extension. Accordingly, the ramp/lift assembly and ramp extension together form a transition surface between the vehicle floor and an alighting surface. Typically, the ramp extension extends approximately one foot outside the cabin of the vehicle in the extended position and the ramp/lift assembly is positioned entirely within the cabin of the vehicle between the ramped position and the non-ramped position. In some embodiments, the method includes lifting the ramp/lift assembly from the ramped position to the non-ramped position with a lifting capacity sufficient to lift a wheelchair and wheelchair user, such as a lifting capacity in excess of 750 pounds. Depending on the circumstances, the ramp extension could be rotated from the extended position to a stowed position in which the ramp extension is positioned within the cabin of the vehicle. For example, the ramp extension could be in a substantially vertical orientation in the stowed position.

BRIEF DESCRIPTION OF THE DRAWINGS

The present disclosure will be described hereafter with reference to the attached drawings which are given as non-limiting examples only, in which.

Figure 1:
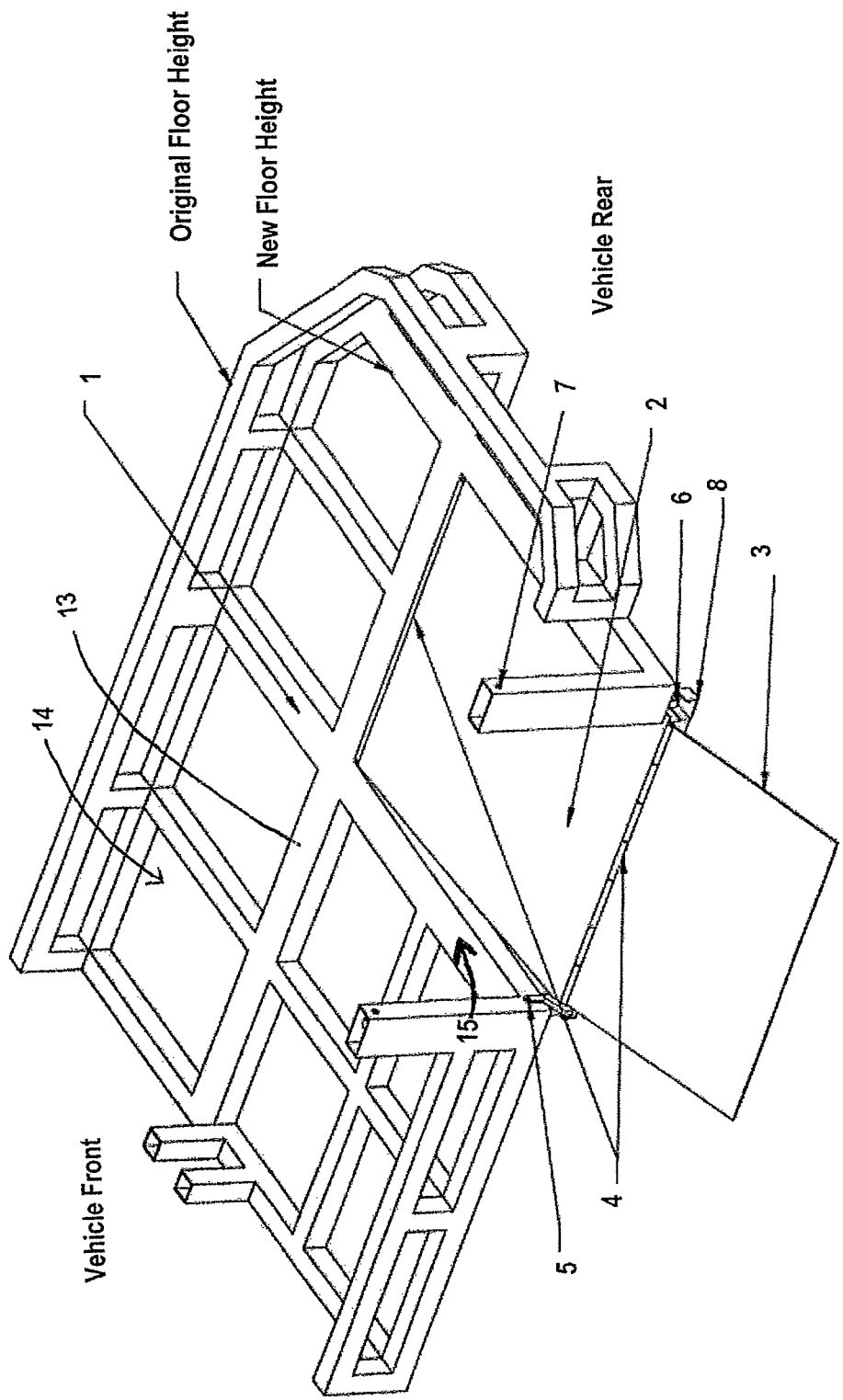
FIG. 1 is a right perspective view of a vehicle showing a frame structure with the sheet metal decking and sides removed for clarity with an example ramp/lift system in the deployed position according to an embodiment of this disclosure.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

This disclosure allows an individual in a wheelchair access to a vehicle, but does it in a unique and advantageous way. This disclosure combines a ramp and lift together, starting well inside the vehicle's interior, so that the ramp, when deployed, only protrudes several inches from the edge of the vehicle rather than several feet. The user will roll onto the ramp and stay there while the lifting mechanism lifts the wheelchair and the ramp up into the vehicle. This description will pertain to using this invention on a sport utility vehicle ("SUV"), such as a Chevy Traverse; however, it can be applied to numerous vehicles, such as minivans, etc.

Figure 6:
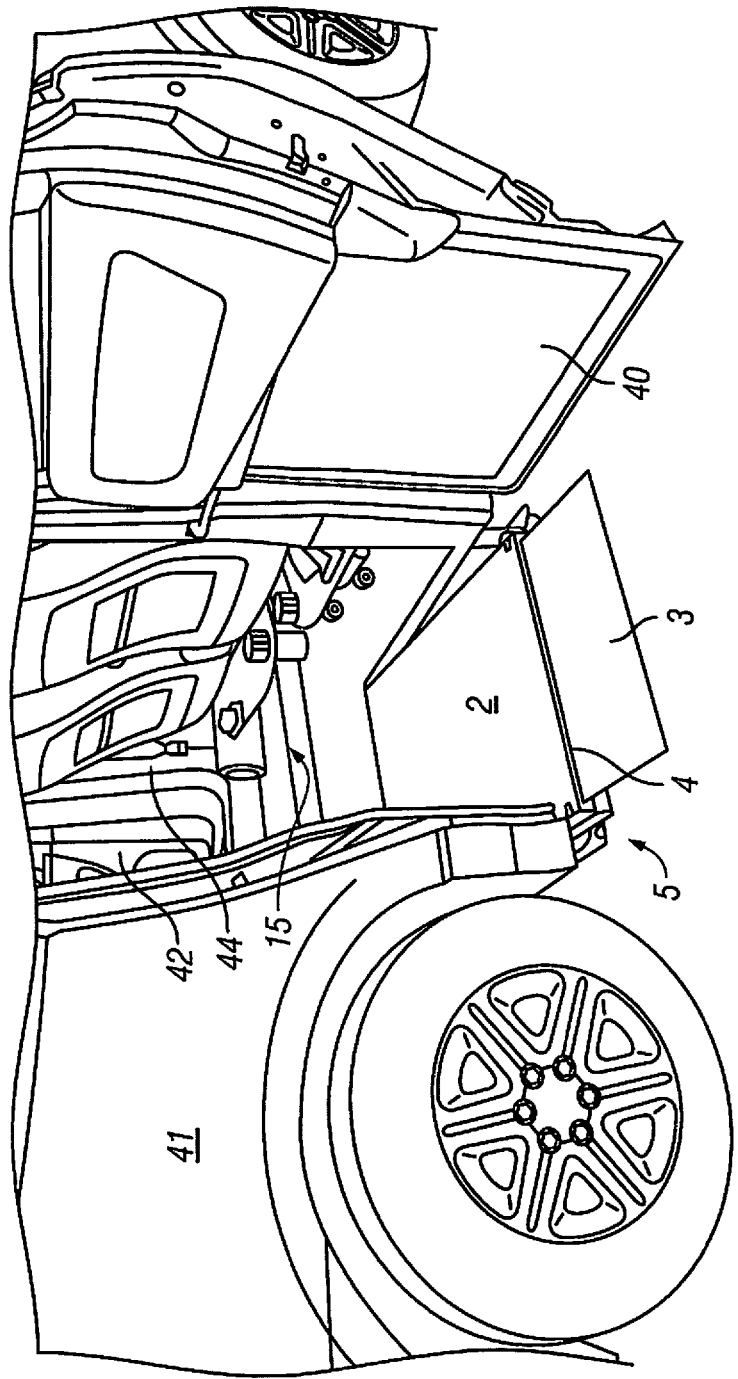
FIG. 6 is a partial perspective view of a vehicle showing the ramp/lift system in a ramped position.

FIG. 1 shows a vehicle with a frame structure 1 having the sheet metal decking and sides removed for clarity (driver side wall 44 and passenger side wall 41 shown in FIG. 6). The vehicle includes a floor 13 and a vehicle cabin 14 accessible through an opening 15. Although the opening 15 is shown on the left side of the vehicle in this example, one skilled in the art should appreciate that the opening 15 could be on the right side and/or right side of the vehicle. This assembly is shown in this example to be aligned with the rear driver's side door 42, but it could be placed in other locations as well, including aligned with the rear passenger side door 40 (see FIG. 6). As shown, the floor 13 has been lowered from its original height to make the vehicle cabin 14 more easily accessible with a wheelchair. The frame 1 is shown using larger structural members around the opening of the ramp. These are designed to create adequate structure in the vehicle to replace the strength lost when this section is removed. There are numerous ways to create this structure that should be known to those skilled in the art. The original door (see FIG. 6) can be operated manually or powered. It can be done in a conventional manner or converted to a gull wing type door, depending on user preference.

Figure 2:
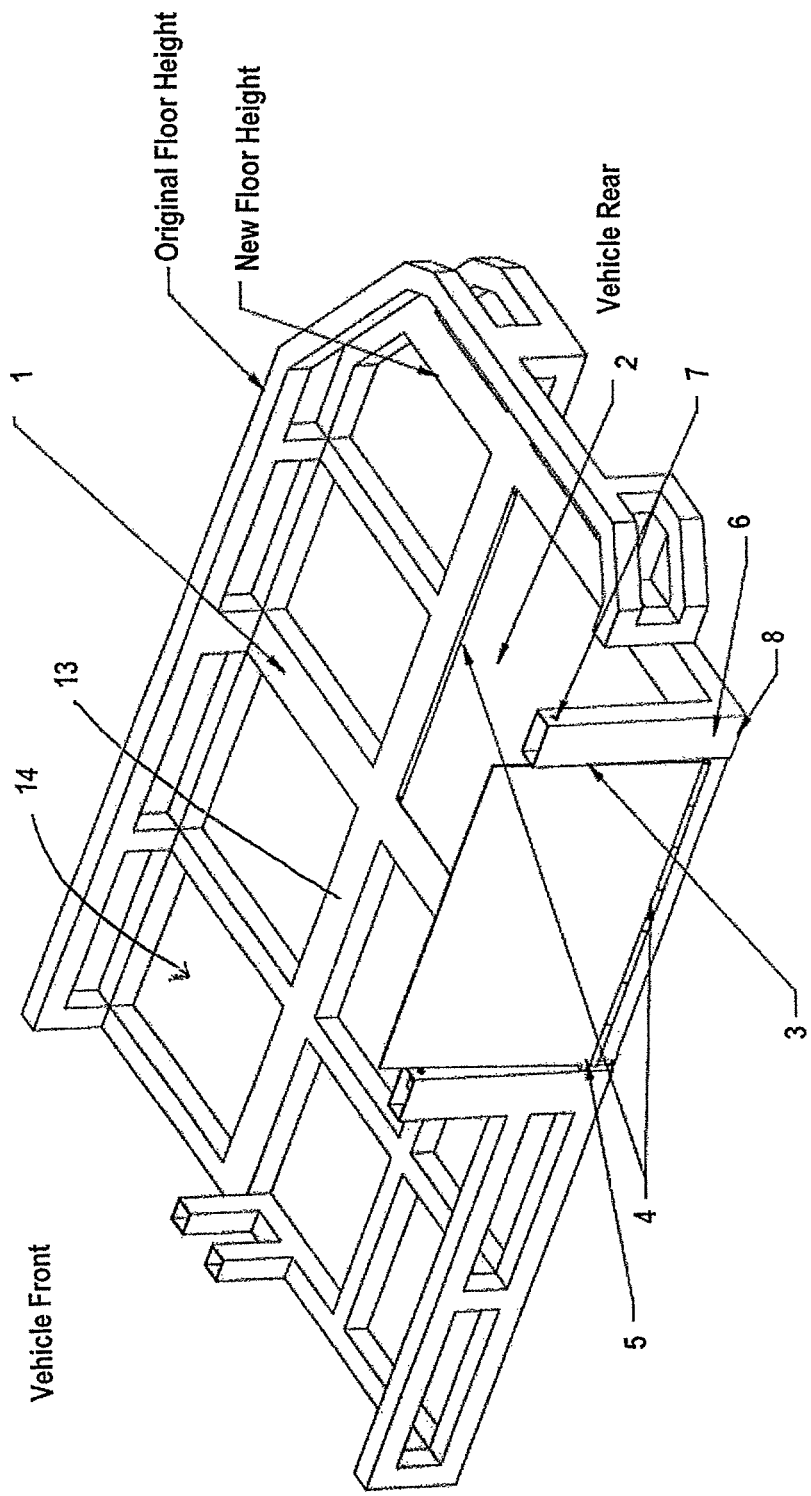
FIG. 2 is a right perspective illustration of the vehicle shown in FIG. 1 with the ramp/lift system in the stowed position.

In the embodiment shown in FIG. 1, a ramp/lift assembly 2 is positioned adjacent the opening 15 in the vehicle cabin 14. The ramp/lift assembly 2 includes a ramp surface movable between a ramped position (FIG. 1) and non-ramped position (FIG. 2). In the ramped position, the ramp surface defines an inclined plane between the vehicle floor 13 and a ramp extension 3. In the non-ramped position, the ramp surface is substantially flush with the vehicle floor. The ramp/lift assembly 2 also acts as a lifting mechanism to lift a wheelchair and move the ramp extension 3 to its stowed position.

As shown, the ramp extension 3 is pivotally connected to an end of the ramp/lift assembly 2 with hinges 4. The ramp extension 3 rotates between an extended or deployed position (FIG. 1) and a stowed position (FIG. 2) via a lift actuator (discussed below). The hinges 4 allow the ramp/lift assembly 2 and the ramp extension 3 to move relative to the frame 1 and each other. Although a certain type of hinge is shown in the figures for purposes of example, one skilled in the art should appreciate that numerous existing hinging devices could be used.

Figure 5:
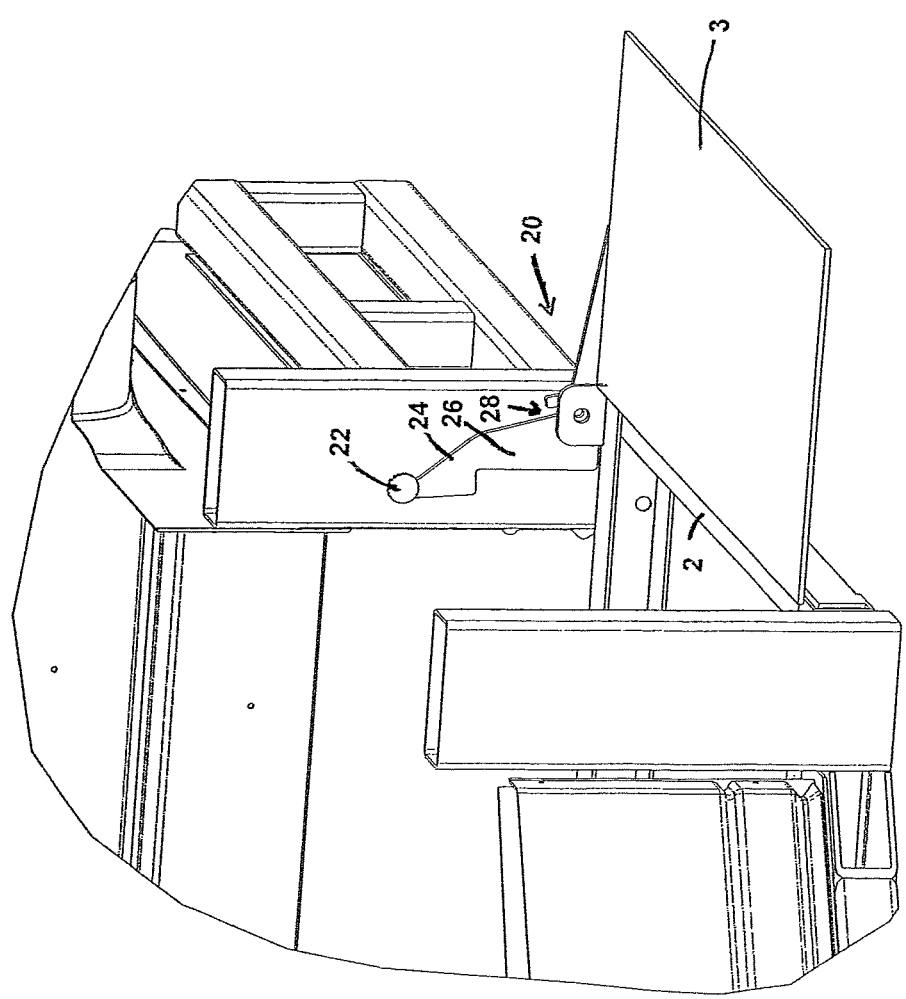
FIG. 5 is a perspective view of an example ramp extension linkage assembly according to another embodiment of this disclosure.

A linkage assembly 5 forces the ramp extension 3 to fold when it is moved to its stowed position. This also allows the ramp extension 3 to protect the wheelchair from rolling off the ramp/lift assembly 2 as the lift feature is activated. In the embodiment shown, the linkage assembly 5 includes a linkage arm 11 and a ramp link 12. The linkage arm 11, as shown, is fixably attached to the ramp extension 3. The ramp link 12 has a first end pivotally attached to the linkage arm 11 and a second end pivotally attached to the frame (1). As the ramp/lift assembly 2 is raised, the linkage assembly 5 causes the ramp extension 3 to automatically swing upward into its stowed position (as shown in FIG. 2). A linkage assembly 20 according to another embodiment is shown in FIG. 5. The linkage assembly 20 moves the ramp extension 3 to the stowed position responsive to movement of the ramp/lift assembly 2 to the non-ramped position; conversely, the linkage assembly 20 moves the ramp extension 3 to the extended position responsive to movement of the ramp/lift assembly 2 to the ramped position. In the embodiment shown, the linkage assembly 20 includes a projection 22 that cams with a cam surface 24 of a camming member 26. As the ramp/lift assembly 2 moves towards the non-ramped position, the curvature of the cam surface 24 camming on the projection 22 rotates the ramp extension 3 to the stowed position; conversely, movement of the ramp/lift assembly 2 to the ramped position causes the cam surface 24 to cam on the projection 22 to extend the ramp extension 3. The camming member 26 includes a slot 28 that receives the projection 22 when the stowed position. The linkage assembly embodiments 5, 20 are shown for purposes of example, but numerous types of linkages could be used to move the ramp extension 3 between its extended and stowed positions.

The ramp/lift assembly 2 and ramp extension are moved using a lift actuator, which could be a hydraulic cylinder, electric actuator, pneumatic cylinder or other linear actuator. In the embodiment shown, the lift actuator comprises two lifting cylinders 16 (best seen in FIG. 3). Item 6 shows the bottom of one of the two lifting cylinders 16. The lifting cylinders 16 include an upper cylinder mount 7 and a lower cylinder mount 8.

Figure 3:
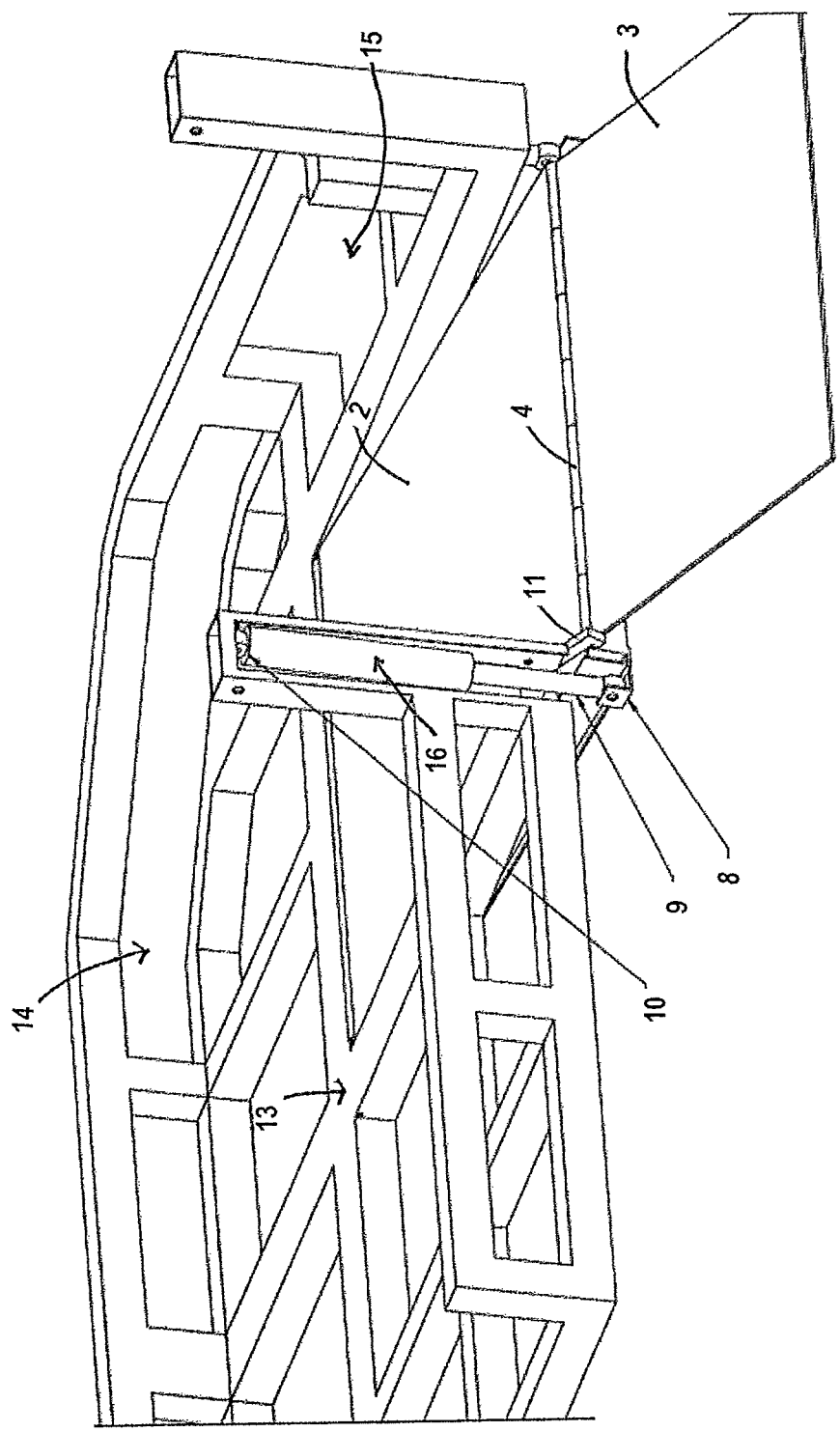
FIG. 3 is a right perspective view of the vehicle shown in FIG. 1 where a portion of the frame has been removed to show the cylinder location more clearly.
Figure 4:
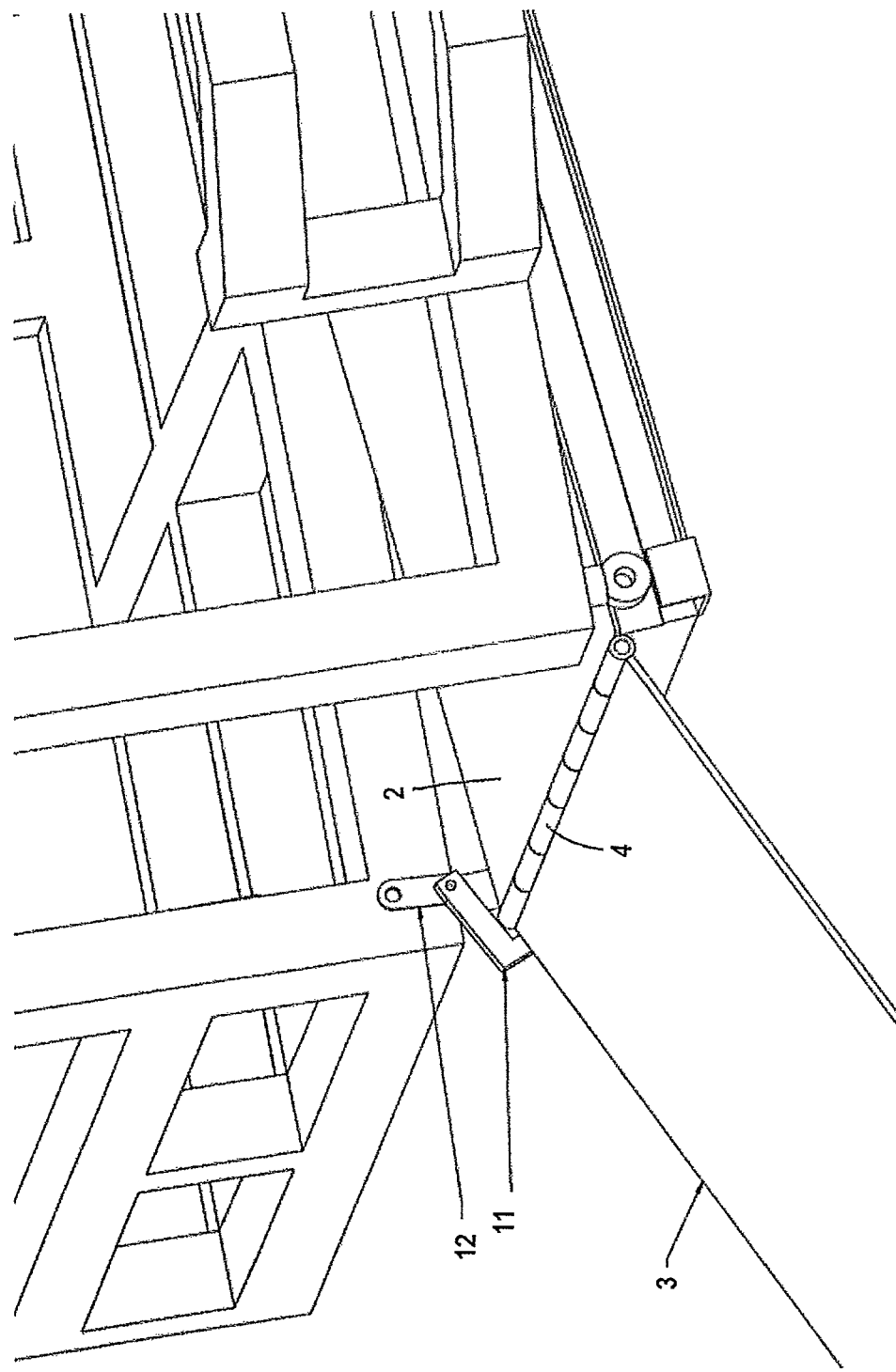
FIG. 4 is a detailed perspective view of the ramp/lift system shown in FIG. 1 showing an example ramp extension linkage assembly used in an embodiment of this disclosure.

FIG. 3 shows a portion of the frame 1 removed to show the cylinder 16 location more clearly. As shown, the lifting cylinders 16 include a cylinder rod 9 and a cylinder housing 10. FIG. 4 shows the detail of the ramp extension linkage.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

The invention claimed is:

1. A combined wheelchair ramp and lift system for use with a sport utility vehicle ("SUV") or a minivan, the system comprising:
   a ramp extension movable between a stowed position in which the ramp extension is positioned within a vehicle cabin of a sport utility vehicle ("SUV") or a minivan and an extended position in which the ramp extension extends out of an opening in the vehicle cabin;
   a ramp/lift assembly adjacent the ramp extension, wherein the ramp/lift assembly includes a ramp surface pivotal between a ramped position in which the ramp surface defines an inclined plane between a floor of the vehicle cabin and the ramp extension and a non-ramped position in which the ramp surface is substantially flush with the floor;
   a first hinge configured to pivotally connect a first end of the ramp/lift assembly and the floor, wherein the first end of the ramp/lift assembly pivots about an axis extending substantially along a longitudinal axis of the vehicle cabin;
   a second hinge configured to pivotally connect a second end of the ramp/lift assembly and the ramp extension, wherein the ramp extension pivots about an axis that is substantially parallel but offset from the axis about which the first end of the ramp/lift assembly pivots; and
   a lift actuator configured to pivot the ramp/lift assembly between the ramped position and the non-ramped position, wherein the lift actuator has a lifting capacity configured to move the ramp surface to the non-ramped position under a weight of a wheelchair and wheelchair user.

2. The system as recited in claim 1, wherein the lifting capacity of the lift actuator is in excess of 750 pounds.

3. The system as recited in claim 1, wherein the ramp surface of the ramp/lift assembly is configured to be positioned entirely within the vehicle cabin between the ramped position and the non-ramped position.

4. The system as recited in claim 1, wherein the ramped surface is dimensioned to support an entire wheelchair.

5. The system as recited in claim 1, wherein the width of the ramp surface is approximately 70% of the width of the floor.

6. The system as recited in claim 1, wherein the ramp extension extends out of the vehicle cabin approximately one foot or less in the extended position.

7. The system as recited in claim 1, wherein the ramp extension extends approximately transversely with respect to the floor in the stowed position.

8. The system as recited in claim 1, further comprising a linkage assembly configured to move the ramp extension between the stowed position and the extended position responsive to pivoting of the ramp/lift assembly between the ramped position and the non-ramped position.

9. The system as recited in claim 8, wherein the linkage assembly includes a linkage arm fixably attached to the ramp extension.

10. The system as recited in claim 9, wherein the linkage assembly includes a ramp link with a first portion pivotally attached to the linkage arm and a second portion pivotally attachable to a vehicle body.

11. The system as recited in claim 1, wherein the ramp extension is configured to move between the extended position and stowed position by rotating about the hinge.

12. A combined wheelchair ramp and lift system for use with a sport utility vehicle ("SUV") or a minivan, the system comprising:
   a ramp extension configured to pivot between a stowed position in which the ramp extension is positioned within a vehicle cabin of a sport utility vehicle ("SUV") or a minivan and an extended position in which the ramp extension extends out of an opening in the vehicle cabin;
   a ramp/lift assembly adjacent the ramp extension, wherein the ramp/lift assembly includes a ramp surface pivotal between a ramped position in which the ramp surface defines an inclined plane between a floor of the vehicle cabin and the ramp extension and a non-ramped position in which the ramp surface is substantially flush with the floor, wherein the ramp surface of the ramp/lift assembly is configured to be positioned entirely within the vehicle cabin between the ramped position and the non-ramped position;

a first hinge configured to pivotally connect a first end of the ramp/lift assembly and the floor, wherein the first end of the ramp/lift assembly pivots about an axis extending substantially along a longitudinal axis of the vehicle cabin;

a second hinge configured to pivotally connect a second end of the ramp/lift assembly and the ramp extension, wherein the ramp extension pivots about an axis that is substantially parallel but offset from the axis about which the first end of the ramp/lift assembly pivots;

a linkage assembly configured to move the ramp extension between the stowed position and the extended position responsive to pivoting of the ramp/lift assembly between the ramped position and the non-ramped position; and a lift actuator configured to pivot the ramp/lift assembly between the ramped position and the non-ramped position.

13. The system as recited in claim 12, wherein the ramped surface is dimensioned to support an entire wheelchair.

14. The system as recited in claim 12, wherein the width of the ramp surface is approximately 70% of the width of the vehicle cabin.

15. The system as recited in claim 12, wherein the ramp extension extends approximately transversely with respect to the vehicle cabin in the stowed position.

16. A combined wheelchair ramp and lift system for use with a sport utility vehicle ("SUV") or a minivan, the system comprising:

a ramp extension movable between a stowed position in which the ramp extension is positioned within a vehicle cabin of a sport utility vehicle ("SUV") or a minivan and an extended position in which the ramp extension extends out of an opening in the vehicle cabin;

a ramp/lift assembly adjacent the ramp extension, wherein the ramp/lift assembly includes a ramp surface pivotal between a ramped position in which the ramp surface defines an inclined plane between a floor of the vehicle cabin and the ramp extension and a non-ramped position in which the ramp surface is substantially flush with the floor;

a hinged arrangement configured to provide pivotal movement of the ramp/lift assembly and the ramp extension with respect to the floor, wherein the hinged arrangement includes at least two spaced apart axes about which the ramp/lift assembly and the ramp extension pivot that are parallel with each other and extend substantially along a longitudinal axis of the vehicle cabin; and a lift actuator configured to pivot the ramp/lift assembly between the ramped position and the non-ramped position, wherein the lift actuator has a lifting capacity configured to move the ramp surface to the non-ramped position under a weight of a wheelchair and wheelchair user.

17. The system as recited in claim 16, wherein the ramped surface is dimensioned to support an entire wheelchair.

18. The system as recited in claim 16, wherein the width of the ramp surface is approximately 70% of the width of the vehicle cabin.

19. The system as recited in claim 16, wherein the ramp extension extends approximately transversely with respect to the vehicle cabin in the stowed position.

20. The system as recited in claim 16, wherein the lifting capacity of the lift actuator is in excess of 750 pounds.

* * * * *